United States Patent [19]

Corner et al.

[11] 4,360,768
[45] Nov. 23, 1982

[54] HIGH CURRENT ACCELERATION SERVOMOTOR DRIVER

[75] Inventors: Gary W. Corner; Gary W. Jorgenson, both of Longmont, Colo.

[73] Assignee: International Business Machines Corporation, Armonk, N.Y.

[21] Appl. No.: 5,646

[22] Filed: Jan. 22, 1979

[51] Int. Cl.³ .............................................. H02P 5/16
[52] U.S. Cl. .................................. 318/389; 318/331; 318/417
[58] Field of Search ............... 318/341, 416, 417, 331, 318/389, 388

[56] References Cited

U.S. PATENT DOCUMENTS

| | | | |
|---|---|---|---|
| 2,928,009 | 3/1960 | Powell | 307/254 |
| 3,293,522 | 12/1966 | Lewis | 318/314 |
| 3,383,578 | 5/1968 | Lewis | 318/624 |
| 3,617,845 | 11/1971 | McKenna | 318/331 |
| 3,706,020 | 12/1972 | Klang | 318/270 |
| 3,740,634 | 6/1973 | Bonzano | 318/345 |
| 3,803,471 | 4/1974 | Price et al. | 318/341 |
| 4,017,745 | 4/1977 | McMahon | 307/254 |

Primary Examiner—David Smith, Jr.
Attorney, Agent, or Firm—Charles E. Rohrer

[57] ABSTRACT

A motor control circuit for providing high acceleration currents by providing a driver comprising a transistor operating in the saturated region in parallel with a transistor operated in the nonsaturated region. The saturated transistor supplies the heavy accelerating current while the nonsaturated transistor is controlled to provide an increasing current through the accelerating period to make up for drops in the current flows through the saturated transistor due to build up of back emf in the motor.

2 Claims, 2 Drawing Figures

HIGH CURRENT ACCELERATION SERVOMOTOR DRIVER

This invention relates to a circuit for controlling a motor and more particularly to a circuit providing fast acceleration of high mass loads.

BACKGROUND OF THE INVENTION

In applications which require a motor to accelerate a relatively high mass load over a short time period control transistors operated in the linear region are placed in parallel in numbers necessary to handle the power dissipation required. While that technique operates satisfactorily from a motor control viewpoint, the cost of the circuit becomes very substantial where a large number of transistors are needed in order to handle the load. Consequently, it is the object of this invention to solve the above problem by providing a circuit capable of rapidly accelerating a motor under high load conditions without utilizing a large number of transistors.

SUMMARY OF THE INVENTION

This invention utilizes a transistor operating in the saturated region, that is, as a switch, in parallel with a transistor operated in the linear region, that is, as an amplifier, such that when the accelerating circuit is closed heavy accelerating current flows through the saturated transistor. As back emf builds in the motor, current flow through the saturated transistor drops. The nonsaturated transistor which is in parallel to the saturated transistor is controlled to provide an increasing current flow to make up for the drop in current through the saturated transistor, thus enabling the provision of a desired current waveform, for example, keeping a constant current flow through the accelerating period of the motor. When proper motor speed is reached, the saturated transistor is removed from the circuit and the value of current flow through the linear transistor is controlled to a level which just makes up for the power loss in the system due to friction, etc. In that manner the motor may be maintained at a constant speed. If it is necessary to decelerate the motor in a short time period, the circuit operates in the manner just described but with current flow in the opposite direction.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

Figure 1:
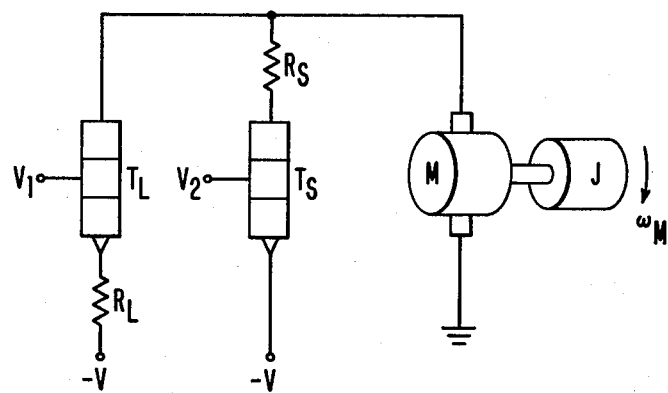
FIG. 1 shows the basic circuit of this invention.

In FIG. 1 a transistor $T_L$ operated in the linear region is shown in parallel with a transistor $T_s$ operated in the saturated region, both of which feed current to a motor M. Motor M drives a load J at a speed level of $\omega_M$.

Referring to FIG. 2, let us assume that at the initial condition the motor is at rest and it is desired to accelerate motor M from rest to a certain desired constant speed. Also, let us assume that it is necessary to accelerate to that constant speed over a short time period $t_1$. If a constant acceleration is desired during that time period, the current through motor M during the accelerating period should be at a constant value as shown in FIG. 2C. After reaching a desired speed, the motor is then to be driven at a constant velocity as shown in FIG. 2D. To accomplish that, FIG. 2C shows that the current through the motor $I_M$ must drop to a low current level just sufficient to make up the frictional and other power losses in moving the driven system at constant speed. During this latter time period, the entire current supply $I_M$ through the motor M is provided through the transistor $T_L$ as shown by comparing FIGS. 2A, 2B and 2C.

Figure 2A:
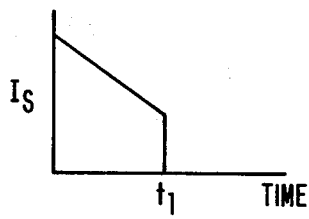
FIG. 2 is comprised of four figures which show a graphical representation of various current levels in the circuit and the velocity level of the motor during an accelerating and constant speed time period.
Figure 2B:
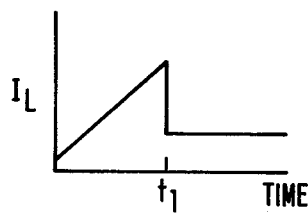
Figure 2C:
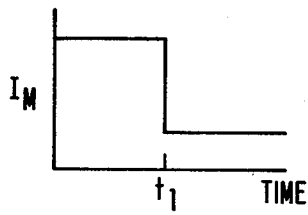
Figure 2D:
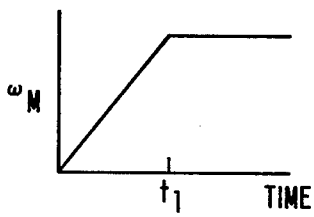

During the accelerating time period, however, it is necessary to supply to the motor a much higher current level and this is accomplished primarily through the saturated transistor $T_S$ as may be seen by noting current level $I_S$ as shown in FIG. 2A. Note, however, that during the accelerating time period the current $I_S$ which can be supplied by the saturated transistor $T_S$ drops in value due to the increasing value of back emf generated by the accelerating motor M. In order to keep constant current $I_M$ during the accelerating time period $t_1$ as shown in FIG. 2C, transistor $T_L$ is regulated such that the current $I_L$ through the transistor $T_L$ is allowed to rise an amount necessary to offset the drop in current $I_S$ supplied from the saturated transistor. Again, refer to FIGS. 2A, 2B and 2C to note the respective current levels during the accelerating period.

Thus, a circuit has been provided in which minimum power is dissipated in the transistor $T_L$ during the acceleration period, thus producing lower junction temperatures and longer life. Also, since less power is dissipated, fewer power transistors are needed to achieve the acceleration profile, and therefore a very real cost savings is realized.

It should be noted that as the speed of the motor increases the power dissipated in the transistor $T_L$ may increase as the current flow through that device rises. To keep that current and thus the power down, multiple current switches to $T_S$ can be placed in parallel and switched on as needed to keep the current flow through the transistor $T_L$ to a desired low level. Note also that this approach can be used to decelerate the motor.

The circuit of this invention may be used to advantage with servo systems where a sensing unit on the load feeds back speed information into a control unit which in turn establishes the control signals $V_1$ and $V_2$ shown in FIG. 1. The $V_2$ signal turns on saturated transistor $T_S$ at the start of an accelerating time period and turns it off when the desired speed is reached while the $V_1$ signal operates to increase current flow through $T_L$ during the acceleration period to obtain the desired current profile. Since servo controls of this kind are well known in the art, none is illustrated here. Example control circuits are given on pages 225-228 and pages 361-364 in *Operational Amplifiers Design and Applications*, McGraw Hill Publishing Company, New York, N.Y., copyright 1971, Burr-Brown Research Corporation, ISBN 07-064917-0.

Note also that this same approach can be used to decelerate the motor by using digital, i.e., saturated current switches in parallel with a linear current control, causing the current to flow in the opposite direction through the motor.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A motor control circuit for keeping a desired motor current waveform comprising:
   a motor;
   switch means for continuously supplying heavy current flow to said motor during an acceleration period; and
   control circuit means comprising a transistor operated in the nonsaturated region connected in parallel with said switch means for supplying increasing continuous current flow to said motor during said acceleration period to at least partially compensate for a drop in current flow through said switch means due to rise in back emf.

2. The circuit of claim 1 wherein said switch means is at least one saturated transistor.

* * * * *

UNITED STATES PATENT AND TRADEMARK OFFICE
CERTIFICATE OF CORRECTION

PATENT NO. : 4,360,768

DATED : November 23, 1982

INVENTOR(S) : Gary W. Corner; Gary W. Jorgenson

It is certified that error appears in the above-identified patent and that said Letters Patent is hereby corrected as shown below:

Column 3, lines 10-12 and column 4, lines 1-10,
Claim 1 should read as follows:

1. A motor control circuit for keeping a desired motor current waveform comprising:

a motor;

output motor current switch means connected to said motor for continuously and directly supplying heavy current flow to said motor during an acceleration period ; and output motor current control means comprising a transistor operated in the nonsaturated region connected to said motor and connected in parallel with said switch means for directly supplying increasing continuous current flow to said motor during said acceleration period to at least partially compensate for a drop in current flow through said switch means due to rise in back emf.

Signed and Sealed this

Nineteenth Day of April 1983

[SEAL]

Attest:

Attesting Officer

GERALD J. MOSSINGHOFF

Commissioner of Patents and Trademarks